UNITED STATES PATENT OFFICE.

ALBERT G. EMERY, OF NEW YORK, N. Y., ASSIGNOR TO RUBBER REGENERATING COMPANY, A CORPORATION OF INDIANA.

METHOD OF MANUFACTURING LEATHER-LIKE MATERIAL.

1,249,360.  Specification of Letters Patent.  Patented Dec. 11, 1917.

No Drawing.  Application filed July 14, 1916.  Serial No. 109,221.

*To all whom it may concern:*

Be it known that I, ALBERT G. EMERY, a citizen of the United States, residing at New York city, in the county and State of New York, have invented certain new and useful Improvements in the Methods of Manufacturing Leather-Like Material, of which the following is a full, clear, and exact description.

This invention relates to a method of treating woven, knitted or felted fibrous materials. The object of this invention is to impart to such materials leather-like qualities such as increased stiffness and wear resisting properties, without appreciable loss of flexibility or power of absorption.

Material treated according to this invention is adapted to a great diversity of uses, among them the manufacture of soles for footwear.

My treatment may be applied to either woven, braided, knitted or felted fibrous material and I wish to be understood as not limiting myself to any one of the above. For most purposes, however, I prefer to use a felt, either wool, cotton, or both, and to avoid confusion, I shall, in the following description confine myself to the treatment of felt, it being understood that my invention includes the treatment of any other form of fibrous structure.

My method consists essentially in the impregnation of the felt or other material with a composition of rosinated linseed oil and suitable fillers, and the subsequent oxidation of the absorbed compound.

The composition which I have found most satisfactory for impregnating felt to be used for manufacturing insoles, is prepared substantially as follows:

Boiled linseed oil of a specific gravity of .96, is further boiled with 5% of calcium rosinate containing 5% of lime. This boiling is continued for about two hours at approximately 412° F., or until the oil is reduced to a semi-gelatinous state. To the rosinated oil as above prepared, I then add suitable fillers and pigments. The filling material and pigment and the proportions in which they are added, varies according to the use to which the finished material is to be put, and I do not limit myself to any specific proportions. A compound which I have found to be very satisfactory for shoe insoles is as follows:

100 parts of rosinated oil,
93 parts American ocher,
7 parts red iron oxid.

When the above compound is thoroughly mixed it is ready for impregnation into the felt. This impregnation may be carried out in several ways, that which I have found most satisfactory consisting in dissolving about 75 parts of the compound in 25 parts of a suitable solvent, for instance, gasolene. The felt is immersed in the solution thus prepared until it is thoroughly saturated, and immediately on its removal is passed through squeeze rollers to remove any surplus. The amount of material desired to be left in the felt varies slightly, and can be regulated by adjusting the tension of the rollers through which it is passed.

Another method of impregnating material, which I have found very satisfactory consists in heating the mixture until it is in a slightly viscous condition and then saturating the felt as with the gasolene solution above mentioned.

The impregnated felt is next subjected to an oxidizing process, that which I have found most satisfactory consisting in subjecting it in a closed chamber to a heat of about 200° F. for approximately two hours. The above degree of temperature and period of time is that which I have found to effect the degree of oxidation best suited for most of the uses to which the finished material is to be put. In case greater hardness is desired in the finished article, this can be accomplished by increasing the degree of temperature, the period of time, or both.

The method of producing oxidation above outlined is mentioned merely as one way of accomplishing the desired result, which can be equally well obtained in several other ways, among which might be mentioned the exposure of the article to air and light, or its exposure to ozone and ultra-violet rays.

The material is preferably finished by suitably buffing the surface on a sand-paper roll, or by the use of a napper. The last mentioned step gives a velvety surface very similar to that of leather, and may be omitted in case the use to which the material is to be put is one not requiring a pleasing appearance.

Material prepared as above outlined possesses practically all of the characteristics of tanned leather and may be used for most of the purposes to which that material is put. It is wear resistant and flexible, but sufficiently stiff to maintain its shape and resist distortion. It is also absorbent and non-heating, properties which make it particularly adapted for shoe insoles.

Having thus described my invention, what I claim as new and desire to protect by Letters Patent is:

1. The method of manufacturing leather-like material which consists in impregnating fibrous material with a compound of linseed oil and metallic rosinate, and then oxidizing the same.

2. The method of manufacturing leather-like material which consists in immersing fibrous material in a compound of linseed oil and metallic rosinate, then removing the surplus oil therefrom, and finally oxidizing that remaining in said fibrous material.

3. The method of manufacturing leather-like material which consists in boiling a mixture of linseed oil and calcium rosinate until it assumes a gelatinous consistency, impregating the fibrous material with said rosinated oil and finally oxidizing the same.

4. The method of manufacturing leather-like material which consists in boiling a mixture of linseed oil and calcium rosinate until it assumes a gelatinous consistency, impregnating fibrous material with said rosinated oil and suitable fillers, and finally oxidizing the same.

5. The method of manufacturing leather-like material which consists in boiling a mixture of linseed oil and calcium rosinate until it assumes a gelatinous consistency, compounding said rosinated oil with American ocher and iron oxid, impregnating fibrous material with said compound, and finally oxidizing the same.

6. A leather-like material comprising a fibrous body impregnated with an oxidized compound of linseed oil and metallic rosinate.

7. A leather-like material comprising a fibrous body impregnated with an oxidized compound of linseed oil and calcium rosinate.

8. A leather-like material comprising a fibrous body impregnated with an oxidized compound consisting of linseed oil and a metallic rosinate, American ocher, and red iron oxid.

9. The method of manufacturing leather-like material which consists in impregnating fibrous material with a compound of linseed oil, metallic rosinate and an alkali, and then oxidizing the same.

10. The method of manufacturing leather-like material which consists in impregnating fibrous material with a compound of linseed oil, a metallic rosinate and lime, and then oxidizing the same.

11. The method of manufacturing leather-like material which consists in impregnating fibrous material with a mixture of linseed oil and metallic rosinate, then oxidizing the same, and finally mechanically treating the exterior of the material to produce a velvety surface.

12. The method of manufacturing leather-like material which consists in impregnating fibrous material with a solution of linseed oil and a metallic rosinate, evaporating the solvent from the material, and then oxidizing the same.

Signed at New York, N. Y., this 10th day of May, 1916.

ALBERT G. EMERY.